Figure 1:
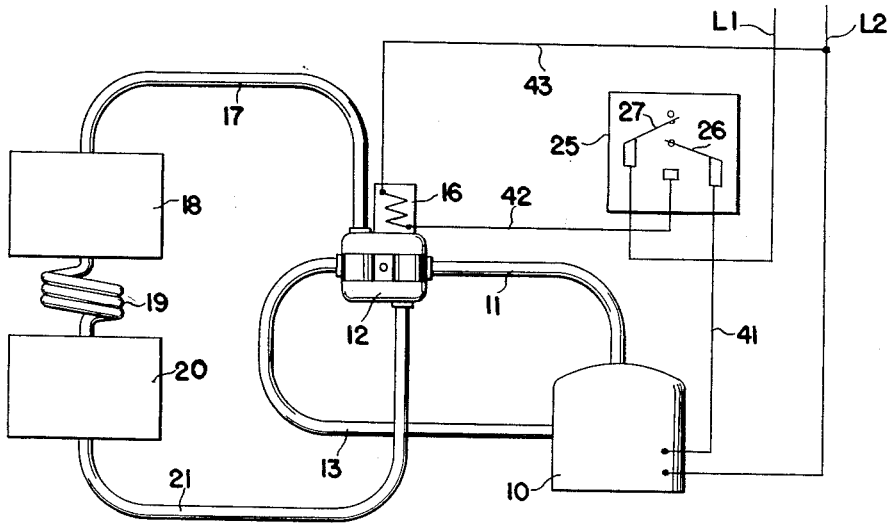

May 14, 1957     J. LIEBERMANN     2,792,465
CONTROL APPARATUS
Filed May 12, 1954

INVENTOR.
JOHN LIEBERMANN
BY

United States Patent Office 2,792,465
Patented May 14, 1957

2,792,465
CONTROL APPARATUS

John Liebermann, Columbus, Ohio, assignor to Ranco Incorporated, Columbus, Ohio, a corporation of Ohio Application May 12, 1954, Serial No. 429,220

5 Claims. (Cl. 200—67)

The present invention relates to control apparatus for a reverse cycle heat exchange system comprising a refrigerant compressor connected with two heat exchangers each of which is adapted to serve either as a refrigerant condenser or evaporator according to the direction of flow of the refrigerant in the system, whereby the system may either heat or cool a medium in heat exchange relation with one of the heat exchangers, the system having electrically operated means to reverse the flow of refrigerant therein. The invention is particularly concerned with apparatus to automatically control operation of the compressor and the flow reversing means to maintain preselected desired temperature of the medium affected by the system.

The principal object of the invention is the provision of a switching mechanism for a so-called reverse cycle system of the type referred to comprising switching means operated by a temperature responsive actuator having a range of movement corresponding to temperature changes within a given range, the actuator being operative to actuate the switching means by oscillating movement corresponding to temperature variations adjacent to one end of the temperature range to control the heating phase of the reverse cycle system and operative to actuate the switching means by oscillatory movement corresponding to temperature changes adjacent to the opposite end of the temperature range to control the cooling phase of operation of the system.

Another object of the invention is the provision of switching mechanism to control operation of the compressor and the refrigerant flow reversing means in a system of the type described according to temperatures of the medium to be controlled, the mechanism comprising two contact members independently movable by a temperature responsive actuator in opposite directions between two spaced stops and engageable with one another to complete the compressor circuit when both members are moved to either of the opposite limits of movement provided by the spaced stops, the members being movable sequentially from one limit to the other by the actuator as the actuator oscillates from one extremity of its operative range of movement to the other, and one contact member being movable between the other member and one of the stops by oscillation of the actuator from one extremity of the range of movement to a point intermediate its range of movement and the other member being movable between the first mentioned member and the other stop by oscillation of the actuator from the other extremity of its range of movement toward the first mentioned extremity. Preferably, one of the stops comprises a switch contact by which an electrical circuit for the fluid reversing means is energized when both contact members are together and resting against the contact stop.

Figures 2, 3, 4:
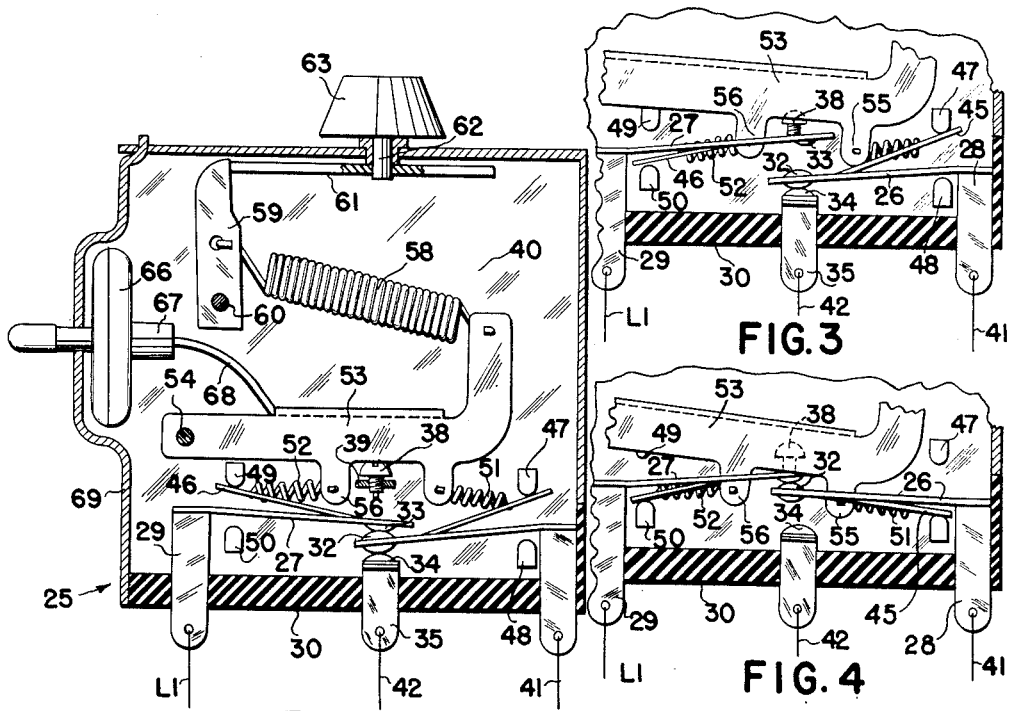

Other objects and advantages of the invention will be apparent from the following description of a preferred form of the invention, reference being made to the accompanying drawings in which Fig. 1 is a schematic showing of a reverse cycle heating and cooling system for a room;

Fig. 2 is a sectional view of a control apparatus embodying the invention for controlling the reverse cycle system shown in Fig. 1; and Figs. 3 and 4 are fragmentary views similar to Fig. 1 but showing certain parts of the control apparatus in different positions.

The invention is here shown for controlling the operation of a reverse cycle refrigeration system for maintaining certain temperatures in a room, although it could be employed in other systems adapted to either supply or absorb heat from any medium desired. In the present disclosure of the invention a compressor-condenser-expander type refrigeration system is shown comprising an electric motor driven compressor 10 having its discharge connected by a tube 11 with the inlet of a reversing or cross-over valve mechanism 12 and its intake connected by tube 13 with the outlet of the valve mechanism.

The valve mechanism 12 is similar in construction to valves commercially available and it has a solenoid 16 for causing shifting of the valve mechanism to change the direction of flow of refrigerant through a pair of reversing ports of the valve body when the solenoid is energized or de-energized. In the form shown, one reversing port of the valve is connected by a tube 17 with a heat exchanger 18, which exchanger is constructed to serve either as a refrigerant condenser or evaporator. The exchanger 18 is connected by a refrigerant flow restrictor in the form of a capillary tube 19 with a second heat exchanger 20 which function similarly to exchanger 18. The end of the exchanger 20 opposite the end connected with the capillary tube is connected by a tube 21 with the reversing port of the valve 12. In accordance with well known practices, the exchanger 18 is arranged to dissipate or absorb heat into or from a medium exteriorly of the room, and the exchanger 20 is arranged to either absorb or dissipate heat with respect to the air of the room. Arrangements for effecting the heat exchange operations mentioned are well known in the art and need not be shown for understanding of the invention.

In the form of the valve mechanism shown, when the solenoid 16 is de-energized and the compressor 10 is operating, refrigerant is circulated from the compressor through tube 11, valve 12 and tube 17 to the exchanger 18 where the refrigerant is condensed. The condensed refrigerant passes through the capillary tube 19 into the exchanger 20 where it vaporizes and absorbs heat from the air of the room, as is well understood in the art. The vaporized refrigerant is withdrawn and returns to the compressor through tube 21, valve 12 and tube 13. When the solenoid 16 is energized by completion of its circuit, explained more fully hereinafter, and the compressor 10 is operating, the refrigerant entering the valve 12 through tube 11 is directed through tube 21 to the exchanger 20 wherein it is condensed and heat dissipated into the room. The condensed refrigerant then passes through the capillary tube 19 into the exchanger 18 where it vaporizes and is returned to the compressor through tube 17, valve 12 and tube 13.

The operations of the compressor 10 and solenoid 16 are controlled by a thermal responsive switching mechanism indicated generally at 25. This mechanism comprises two U-shape flat spring type contact arms 26, 27 having their open ends attached to terminal bracket members 28, 29 respectively, which are embedded in a dielectric base 30. The contact arm 26 has a double contact 32 on the free end thereof and contact arm 27 has a single contact 33 on its free end. The contact arms and their contacts are arranged to engage one another to complete an electrical circuit from terminal 28 to terminal 29 as described more fully hereinafter.

A stationary contact 34 is mounted on a terminal 35 embedded in the base 30 and is engaged by contact 32 when the contact arm 26 is flexed downwardly, as seen in Figs. 2, 3. The contact 35 forms a stop to limit downward movement of the contact arm 26.

A stop 38 is provided to limit upward flexure of the contact arm 27 and is in the form of a screw threaded in a bracket 39 attached to a wall of the housing 40 of the control mechanism. The screw provides means to adjust the position of the stop.

Electric power is supplied by lines L1 L2, and the circuit for the motor 10 includes L1 which is connected to terminal 29, terminal 28, wire 41 to one side of the motor and L2, which is connected to the other side of the motor. Thus, when contacts 32, 33 are engaged the compressor is energized.

The circuit for the solenoid 16 includes terminal 35, wire 42 to one side of the solenoid, and wire 43 to L2. It will be seen that when contacts 32, 33, 34 are engaged as shown in Fig. 2, both the compressor and solenoid are energized. The separation of contact 33 from contacts 32, 34 breaks the circuits for both the solenoid and compressor.

The contact arms 26, 27 are preferably snap actuated, and in the form shown the snap mechanisms comprise U-shaped rigid toggle members 45, 46 disposed within the central openings of the respective contact arms and having the open ends thereof pivoted to the arms 26, 27 respectively. The closed end of the toggle 45 is adapted to oscillate between two stops 47, 48, and the free end of toggle 46 is adapted to oscillate between two stops 49, 50. The stops 47—50 may be attached to the housing 40, and they are preferably adjustably positionable, although the adjusting means is not shown since such means are common in the switching art.

The toggle members 45, 46 are arranged to oscillate about their pivots from one side to the other of the longitudinal center lines of the respective contact arms, 26, 27, and are urged in the direction of their pivots by tension springs 51, 52 respectively, one end of each spring being attached to the respective toggle members adjacent to the free ends thereof and the opposite end thereof being attached to an actuating lever 53. The springs 51, 52 bias the toggle members to one or the other of their respective stops and the tensions thereof in moving the toggle members toward their pivots urges the contact arms 26, 27, either upwardly or downwardly as is explained more fully hereinafter.

The actuator lever 53 is pivoted on a pin 54 supported in the side walls of the housing 40, and the lever has two fingers 55, 56 to which the tension springs 51, 52 are attached, respectively. The lever 53 is urged counterclockwise about its pivot by a spring 58 which may be selectively adjustable by any suitable means; in the form of the invention shown, one end of the spring is attached to the lever 53 and the other end is attached to an adjusting lever 59 pivoted on a pin 60 which is supported by opposite walls of the housing 40. The movable end of the adjusting lever 59 rests against the periphery of a cam 61 which is attached to a manually rotatable stem 62 journaled in the top wall of the housing and having an adjusting knob 63 attached to the upper end thereof. It will be seen that the angular position of the cam 61 determines the angular position of the lever 59 and consequently the tension of spring 58. The knob 63 provides for adjustment of the spring force which tends to rotate the lever 53 counterclockwise and affect the temperatures at which the switching means are operated as is explained hereinafter.

The lever 53 is moved clockwise against the tension of spring 58 by a thermally expansible element 66 which comprises a hollow metallic expansible wafer containing a suitable vapor which increases and decreases in response to the rise and fall of the temperatures to which the element is subjected, which in the present case is the temperature of the air of the room to be controlled. The element 66 includes a post 67 on the outer flexible wall thereof which engages a foot 68 formed on the lever 53. The element 66 is rigidly supported on the end wall 69 of the housing 40 and when the temperature of the room air increases to a predetermined degree the increase in internal pressure of the element flexes the outer wall thereof which moves the lever 53 clockwise. The temperature at which the lever 53 is moved clockwise depends upon the tension of spring 58, as is well understood in the art.

When the temperature of the air is relatively low, the lever 53 will be in the position shown in Fig. 2 wherein the springs 51, 52 are above the center lines of the respective toggle members 45, 46 thereby causing both contact arms 26, 27 to be flexed downwardly against the limit provided by contact 34. In this position electrical contact is established between contacts 32, 33, 34. As described hereinbefore, the compressor and solenoid are thus energized so that the system operates in a manner to cause the exchanger 20 to serve as a condenser and provide heat for the room. As the temperature rises, the element 66 expands and moves lever 53 clockwise, moving the point of connection of the spring 52 with finger 56 below the center line of toggle member 46 which causes the latter to be snapped from engagement with stop 49 to engage stop 50 thereby causing the toggle member to snap flex contact arm 27 upwardly against stop 39 which de-energizes the compressor and solenoid to terminate the heating cycle. The various parts of the mechanism are arranged so that spring 51 will not be moved below the center line of the toggle member 45 by the lever 53 until the amplitude of expansion of the element 66 corresponds to the room temperature at which cooling is to be effected, which is normally somewhat above the range of temperature at which the heating phase is operative. It will be seen that the lever 53 is oscillated adjacent to the lower end of the range of temperatures to be maintained to cause movement of only the contact arm 27 between contact 32 and stop 38 to produce starting and stopping of the system for controlling the heating cycles.

As the temperature of the room increases above the range at which heating is desired, the lever 53 is moved clockwise until the point of connection of the spring 51 and finger 55 is moved below the centerline of the toggle member 45 which causes the latter to be snap moved from stop 47 to stop 48, and thereby snap flexes contact arm 26 upwardly to engage contact 32 with contact 33, as shown in Fig. 4. This contact engagement closes the compressor circuit, and since the solenoid is de-energized, the refrigerant is circulated first through the exchanger 18 where it is condensed, and then to the exchanger 20 where it evaporates to provide an air cooling cycle. Upon a predetermined drop in temperature in the room, lever 53 is rotated counterclockwise to move toggle spring 51 above the centerline of the toggle member 45 which causes contact arm 26 to be snap moved from contact 33 to contact 34 and thereby terminate operation of the compressor.

It will be seen that when the actuating lever 53 is oscillated at one end of the range of movement in which it is operative to actuate the switch arms, such as during the lower temperature conditions mentioned, only arm 27 is actuated whereby the heating phase of the operation of the system is cycled to provide the necessary heat to maintain the desired room temperature. As the lever 53 is moved toward the other end of its range of movement due to increase in room temperature above that provided by the heating cycle, it is effective to actuate the contact arms to the raised position so that the compressor can be operated without energization of the solenoid 16 whereby cooling cycles are produced. The lever 53 will oscillate adjacent to the last mentioned end of its range of movement to start and stop the cooling cycles according to the rise and fall in room temperature. Thus, by utilizing a single thermally responsive member and two moving contact arms, control of both the heating and cooling phases can be accurately effected.

It is to be understood that the thermally responsive element shown at 66 is illustrative only and any other suitable power element could be substituted therefor. Likewise, the adjusting mechanism for the range spring 58 is merely to illustrate the invention and any suitable mechanism for accomplishing this purpose could be employed, or the adjusting feature could be omitted, under certain conditions, if desired.

While I have described but one form of the invention, it will be understood that other forms, modifications and adaptations could be embodied falling within the scope of the appended claims.

I claim:

1. Control apparatus comprising, two contact members movable between limits in opposite directions and engageable with one another at opposite limits of their movements, an actuator movable in opposite directions through a given range of movement, means operatively connecting said actuator and said contact members to cause said contacts to engage and disengage one another by reversing movement of said actuator in limited ranges of movement adjacent to each end of said given range of movement thereof, and a third contact member adapted to be engaged by one of said two contact members when said two contact members are at one of their limits of movement.

2. Control apparatus comprising, two contact members engageable with one another and independently movable in opposite directions, two spaced stops engageable by the respective contact members to limit movement of said members in opposite directions, each of said members when engaging its stop being engageable by the other member to complete an electric circuit through said members, an actuator movable in opposite directions through a range of movement, means operatively connecting said actuator with said contact members to sequentially shift said contact members between the limits established by said stops during movement of said actuator in either direction whereby said actuator may be oscillated adjacent to one extremity of its range of movement to shift one of said contact members between engagement with the other contact member and one of said stops and oscillated adjacent to the other extremity of its range of movement to shift the other of said contact members between said one member and the other of said stops, and means for connecting said contact members in an electric circuit.

3. Control apparatus comprising, two contact members engageable with one another and independently movable in opposite directions, two spaced stops engageable by the respective contact members to limit movement of said members in opposite directions, one of said stops comprising an electrical contact and adapted to complete an electric circuit through the contact member engaging therewith, each of said members when engaging its stop being engageable by the other member to complete an electric circuit through said members, an actuator operative in opposite directions through a range of movement, and means operatively connecting said actuator with said contact members to sequentially shift said contact member between the limits established by said stops during movement of said actuator in one direction or the other whereby said actuator may be oscillated adjacent to one extremity of its range of movement to shift one of said contact members between engagement with the other contact member and said one stop and oscillated adjacent to the other extremity of its range of movement to shift the other of said contact members between said one member and the other of said stops.

4. Control apparatus comprising, two snap acting switching mechanisms including contact members yieldably engageable with one another and independently shiftable in opposite directions with a snap movement, two spaced stops engageable by the respective contact members to limit movement of said members in opposite directions, each of said members when engaging its stop being engageable by the other member to complete an electric circuit through said members, an actuator operative in opposite directions through a range of movement, means operatively connecting said actuator and said contact members to sequentially shift said contact members between the limits established by said stops during movement of said actuator in opposite directions whereby, said actuator may be oscillated adjacent to one extremity of its range of movement to cause shifting of one of said contact members between engagement with the other contact member and one of said stops and oscillated adjacent to the other extremity of its range of movement to cause shifting of the other of said contact members between said one member and the other of said stops, and means for connecting said contact members in an electric circuit.

5. Control apparatus comprising two pivoted contact arms, means to limit shifting of the free ends of the contact arms in opposite directions, the free end portions of said arms engaging one another when moved to the same limit and disengaging when one is moved from one limit to the other, a shiftable actuator for said arms, and overcenter springs connecting said actuator with the respective arms and urging said arms to one limit or the other, said actuator sequentially moving said springs from one side to the other of the dead centers of said springs connected thereto during movement of said actuator in one direction.

References Cited in the file of this patent

UNITED STATES PATENTS

| | | |
|---|---|---|
| 2,515,078 | Cowardin | July 11, 1950 |
| 2,540,421 | Broch | Feb. 6, 1951 |
| 2,568,323 | Dales | Sept. 18, 1951 |
| 2,574,429 | Wood | Nov. 6, 1951 |
| 2,591,802 | Gardner | Apr. 8, 1952 |
| 2,654,227 | Muffly | Oct. 6, 1053 |
| 2,695,939 | Filliette | Nov. 30, 1954 |